Figure 1:
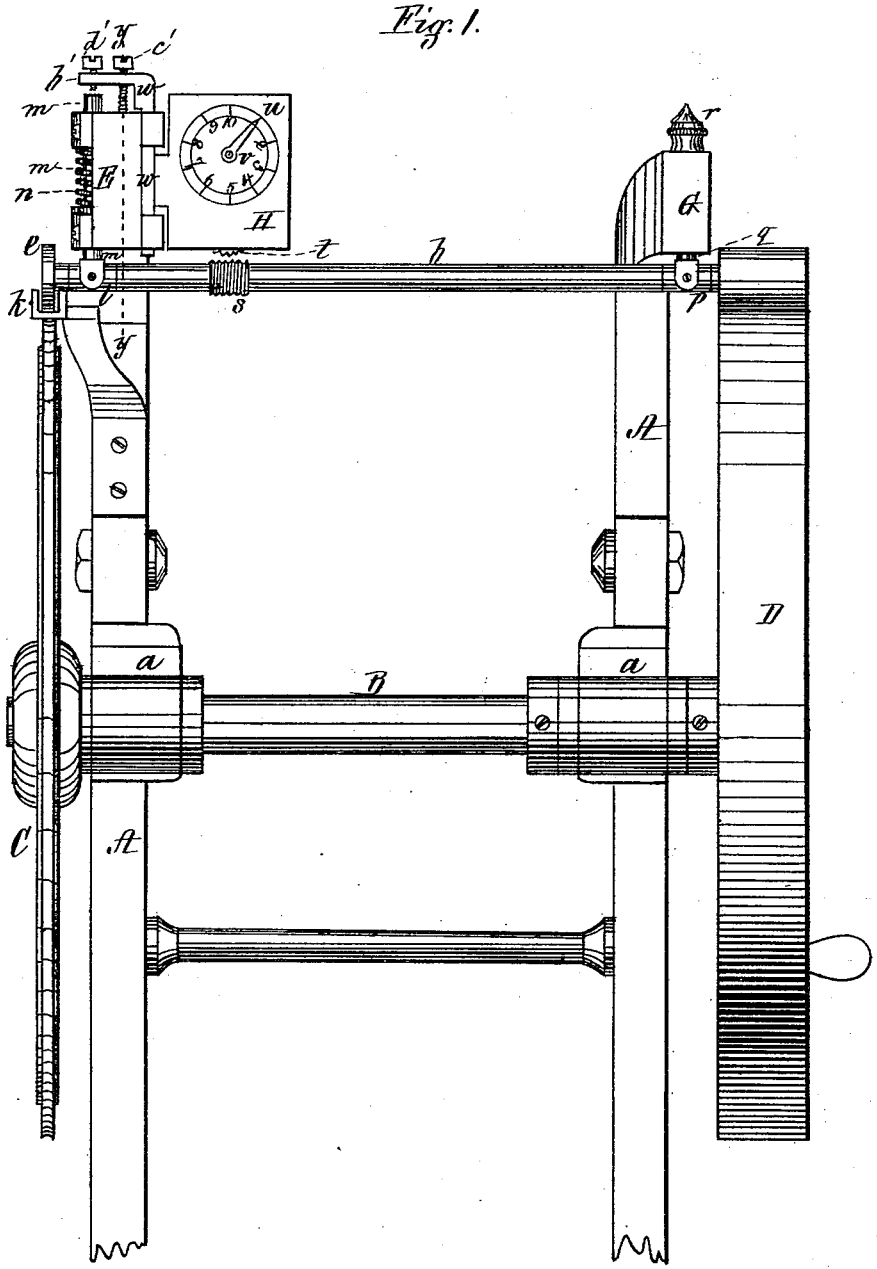

N. H. RICHARDSON.
Measuring-Mechanism for Rattan-Machines.
No. 167,358. Patented Aug. 31, 1875.

N. H. RICHARDSON.
Measuring-Mechanism for Rattan-Machines.
No. 167,358. Patented Aug. 31, 1875.
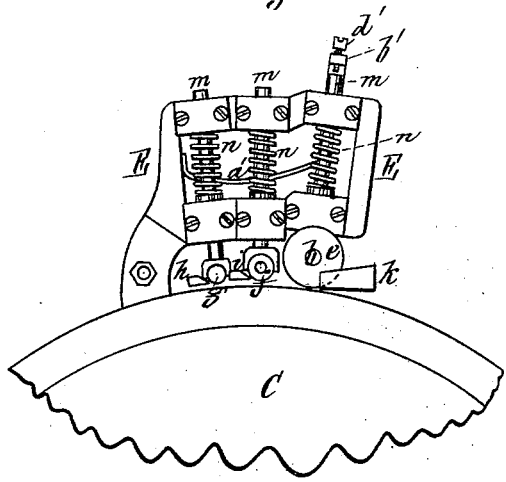
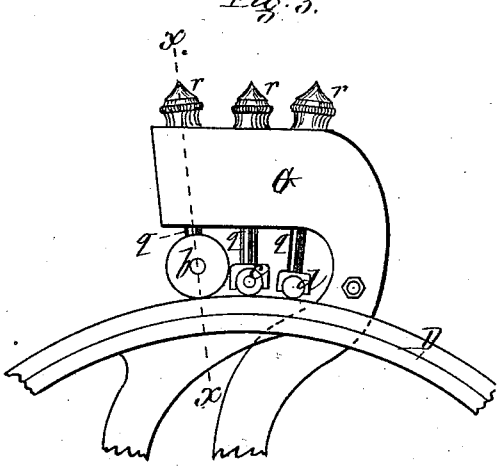
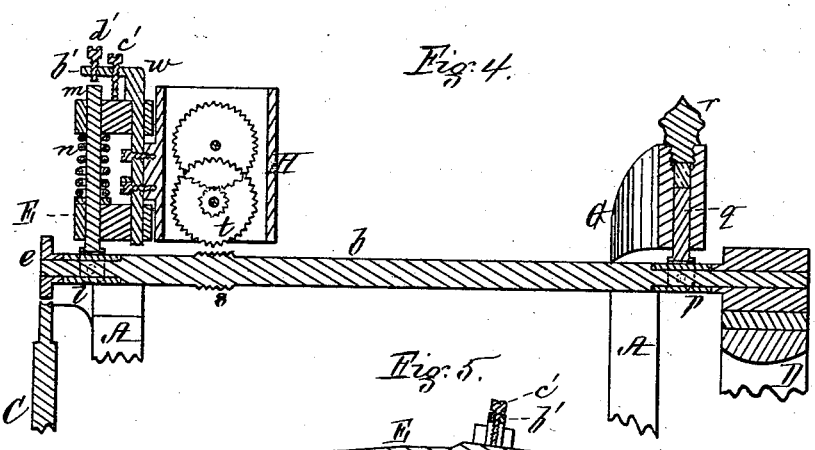
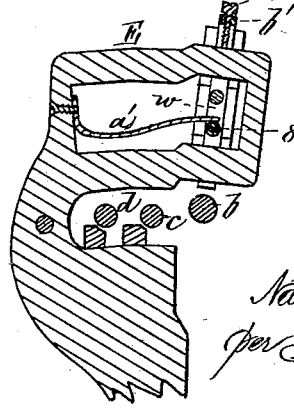

UNITED STATES PATENT OFFICE

NATHAN H. RICHARDSON, OF FITCHBURG, MASSACHUSETTS.

IMPROVEMENT IN MEASURING MECHANISMS FOR RATTAN-MACHINES.

Specification forming part of Letters Patent No. 167,358, dated August 31, 1875; application filed June 10, 1875.

*To all whom it may concern:*

Be it known that I, NATHAN H. RICHARDSON, of Fitchburg, in the county of Worcester and State of Massachusetts, have invented certain Improvements in Rattan-Machines, of which the following is a full, clear, and exact description, reference being had to the accompanying drawings, making part of this specification, in which—

Figure 1 is a front elevation of a machine for shaving chair-cane having my improvements applied thereto. Fig. 2 is an elevation of the upper portion of one side of the same. Fig. 3 is an elevation of the upper portion of the opposite side of the same. Fig. 4 is a vertical section on the line $x\ x$ of Fig. 3. Fig. 5 is a vertical section on the line $y\ y$ of Fig. 1.

In the manufacture of split rattan or chair-cane, which is sold by measurement, the strands are sorted out into parcels, (pieces of about the same length being placed together,) after which they are measured and counted. These operations consume considerable time, and mistakes are liable to occur, both in the measurement and counting of the strands.

This invention has for its object to overcome these difficulties; and consists in the application of a registering mechanism to a rattan-machine, whereby the number of feet of cane passing through the machine can be accurately recorded, and the inconvenience and expense of counting and measuring entirely avoided.

To enable others skilled in the art to understand and use my invention, I will proceed to describe the manner in which I have carried it out.

In the said drawings, A represents the framework of the machine, in suitable bearings $a\ a$ in which runs the main shaft B, which carries at one end a large wheel or disk, C, and at the opposite end a friction-wheel, D, which serves to drive the horizontal shafts $b\ c\ d$ of the feed-rolls $e\ f\ g$. $h\ i$ are the cutters, by which the chair-cane is shaved as it passes between the grooved periphery of the wheel C and the feed-rolls, a suitable guide, $k$, being placed in front of the roll $e$. Each of the shafts $b\ c\ d$ is supported at one end in a bearing, $l$, which is pivoted to the lower bifurcated end of an upright shaft, $m$, which slides in a head or frame, E, and is surrounded by a spiral spring, $n$, against the resistance of which the feed-roll is raised by the strip of cane as it passes between it and the wheel C. The opposite end of each of the shafts $b\ c\ d$ runs in a bearing, $p$, which is pivoted to the lower bifurcated end of a shaft, $q$, which slides in a head, G, and is pressed down by a screw, $r$, so as to keep the end of the shaft outside the bearing $p$ at all times in contact with the periphery of the wheel D, a rubber or other suitable spring being interposed between the upper end of each shaft $q$ and its screw $r$. On the shaft $b$ is formed a worm, $s$, which, when the shaft is raised by the introduction of a strand of cane between the roll $e$ and wheel C, engages with the lower gear $t$ of a registering mechanism, H, which is so constructed that its hand or pointer $u$ will indicate on the dial $v$ the exact number of feet of cane passing through the machine, and thus, when a predetermined quantity of cane has been shaved, say one thousand feet, it is merely necessary for the attendant to tie up the strands in a bundle ready for sale, no subsequent measuring or counting being required, and consequently a great saving of time and labor is effected.

It is evident from the above description that the registering mechanism may be arranged on a shaft placed in the rear of shaft $b$, and, by means of a roller and worm-screw, be made to measure rattan after it has been shaved without departing from the spirit of my invention.

As soon as the strand of cane has passed out of contact with the roll $e$, the shaft $b$ is pressed down by its spring $n$, which instantly disengages the worm $s$ from the registering mechanism, as is absolutely necessary, owing to the continuous revolution of the shaft $b$. The registering mechanism H is secured to, and supported by, a vertical bar, $w$, which slides in guides on one side of the head E, and is held down in the required position by a flat spring, $a'$, the free end of which bears upon a pin, 8, projecting from the bar $w$. From the top of this bar $w$ projects a horizontal arm, $b'$, through which passes a set-screw, $c'$, the lower end of which bears against the top of the head E, and by turning this screw the position or height of the registering mechanism with respect to the worm $s$ may be adjusted as required. At the outer end of the arm $b'$ is another set-screw, $d'$, which is situated immediately over the upper end of the shaft $m$. which supports one end of the shaft $b$; and if the shaft $b$ is raised to an unusual height by the passage of a strand of cane of extra thickness between the roll $e$ and wheel C, the end of the shaft $m$ is brought into contact with the screw $d'$, which causes the bar $w$ to be raised against the resistance of the spring $a'$, carrying with it the registering mechanism, which is thus prevented from being injured by the extra upward movement of the worm $s$, as would otherwise be the case.

Instead of a worm, $s$, a pinion, friction-wheel, or other equivalent device may be employed for transmitting the motion of the shaft $b$ to the registering mechanism, and the registering mechanism may be connected with any one of the feed-rolls of the machine, or with a separate roll, in contact with which the cane is made to pass.

I do not confine myself to the employment of a registering mechanism, as above described, in connection with a machine for shaving split rattan, as it is evident that it may be applied to other machines used in the manufacture of chair-cane without departing from the spirit of my invention—for instance, to a machine for splitting rattan into cane-seating, or to a machine for splitting the inner portion or reed into strands.

What I claim as my invention, and desire to secure by Letters Patent, is—

1. In a rattan-machine, the shaft $b$, provided with the worm-screw $s$, and hung to be thrown into and out of engagement with the register by the passage or non-passage of material, in combination with a registering mechanism, substantially as and for the purpose set forth.

2. The registering mechanism H, in combination with the vertical bar $w$, provided with the pin 8 and the spring $a'$, all constructed to operate substantially as and for the purpose set forth.

3. In combination with a rattan-machine, a registering mechanism arranged and applied to be automatically thrown into and out of action on the entrance and exit of a strand of cane, substantially as and for the purpose set forth.

Witness my hand this 7th day of June, A. D. 1875.

NATHAN H. RICHARDSON.

In presence of—
J. M. GODDARD,
ALBERT SAWYER.